United States Patent [19]

Wilson et al.

[11] Patent Number: 5,371,808
[45] Date of Patent: Dec. 6, 1994

[54] AUTOMATED RECOGNITION OF CHARACTERS USING OPTICAL FILTERING WITH MAXIMUM UNCERTAINTY MINIMUM VARIANCE (MUMV) FUNCTIONS

[75] Inventors: Charles L. Wilson, Darnestown; James L. Blue, Rockville, both of Md.

[73] Assignee: The United States of America as represented by the Secretary of Commerce, Washington, D.C.

[21] Appl. No.: 882,926

[22] Filed: May 14, 1992

[51] Int. Cl.$^5$ .............................................. G06K 9/62
[52] U.S. Cl. ........................................ 382/14; 382/10; 382/32; 382/42
[58] Field of Search ............... 382/14, 15, 32, 33, 382/34, 42, 43; G06K 9/62, 9/74, 9/64, 9/68, 9/36; G06F 15/336, 15/332

[56] References Cited

U.S. PATENT DOCUMENTS

| | | | |
|---|---|---|---|
| 3,879,605 | 4/1975 | Carl et al. | 235/156 |
| 4,082,431 | 4/1978 | Ward, III | 350/162 SF |
| 4,590,608 | 5/1986 | Chen et al. | 382/43 |
| 4,854,669 | 8/1989 | Birnbach et al. | 350/162.12 |
| 4,959,870 | 9/1990 | Tachikawa | 382/56 |
| 4,989,257 | 1/1991 | Horowitz | 382/18 |
| 5,014,327 | 5/1991 | Potter et al. | 382/14 |
| 5,047,968 | 9/1991 | Carrington et al. | 364/574 |
| 5,050,220 | 9/1991 | Marsh et al. | 382/4 |
| 5,063,602 | 11/1991 | Peppers et al. | 382/32 |
| 5,086,483 | 2/1992 | Capps | 382/42 |

OTHER PUBLICATIONS

Uncertainty relation for resolution in space, spatial frequency, and Orientation Optimized by Two-dimensional Visual Cortical Filters, pp. 1160–1169 Daugman, Havard University, J. Opt. Soc. AM. A/vol. 2 No. 7/ Jul. 1985.

Complete Discrete 2-D Gabor Transforms by Neural Networks for Image Analysis and Compression, Daugman, IEEE Transactions on Acoustics, Speech and Signal Processing vol. 36, No. 7, Jul. 1988, pp. 1169–1179.

Winner-Take-All Network of O(N) Complexity, Advances in New Information Processing Systems 1, Ed. D. S. Touretzky, 1989, pp. 703–711.

(List continued on next page.)

*Primary Examiner*—Yon J. Couso
*Attorney, Agent, or Firm*—Michael de Angeli

[57] ABSTRACT

A method and apparatus is described for recognition of hand printed characters using maximum uncertainty—minimum variance (MUMV) functions, such as Gabor functions, implemented by optical elements. A set of optical elements having varying optical density corresponding to a set of two-dimensional MUMV functions is generated. A pattern of illumination responsive to the image of the character to be identified is simultaneously transmitted through each of the optical elements implementing the MUMV functions. The amount of light transmitted through each of the elements is measured, providing a transmission coefficient. Such transmission coefficients are used as a set of inputs to a neural network, such that the inputs to the neural network are a set of transmission coefficients resulting from transmission of light corresponding to a character to be identified through a complete set of optical elements implementing a set of two-dimensional MUMV functions. The neural network calculates weighted sums of the transmission coefficients. The neural network may be implemented as a network of resistors connected between input nodes, intermediate nodes, and output nodes. The output node having the highest voltage identifies the character to be identified.

25 Claims, 2 Drawing Sheets

OTHER PUBLICATIONS

Karhunen Loeve Feature Extraction For Neural Handwritten Character Recognition, Patrick J. Grother, Image Recognition Group NISI, SPIE, vol. 1709, Apr. 1992, pp. 1–11.

Training Feed Forward Neural Networks Using Conjugate Gradients, Grother et al, U.S. Department of Commerce NISI NISTIR 4776, Feb. 1992, pp. 1–22.

Massively Parelel Implementation of Character Recognition Systems Garris et al, U.S. Department of Commerce NISI, NISTIR4750, Jan. 1992, pp. 1–12.

Self–Organizing Neural Network Character Recognition on a Massively Parallel Computer, Wilson et al, NIST, International Joint Conference on Neural Networks Proceeding, II, pp. 325–329, Jun. 1990, San Diego, Calif.

Analysis of a Biologically Motivated Neural Network for Character Recognition, Garris et al, NIST, Proceedings: Analysis of Neural Network Applications, ACM Press, George Mason University, May 1991, pp. 160–175.

Methods for Enhancing Neural Network Handwritten Character Recognition, Carris et al, NIST, International Joint Conference on Neural Networks, vol. 1, IEEE, Seattle, Jul. 1991, pp. I–695–I–700.

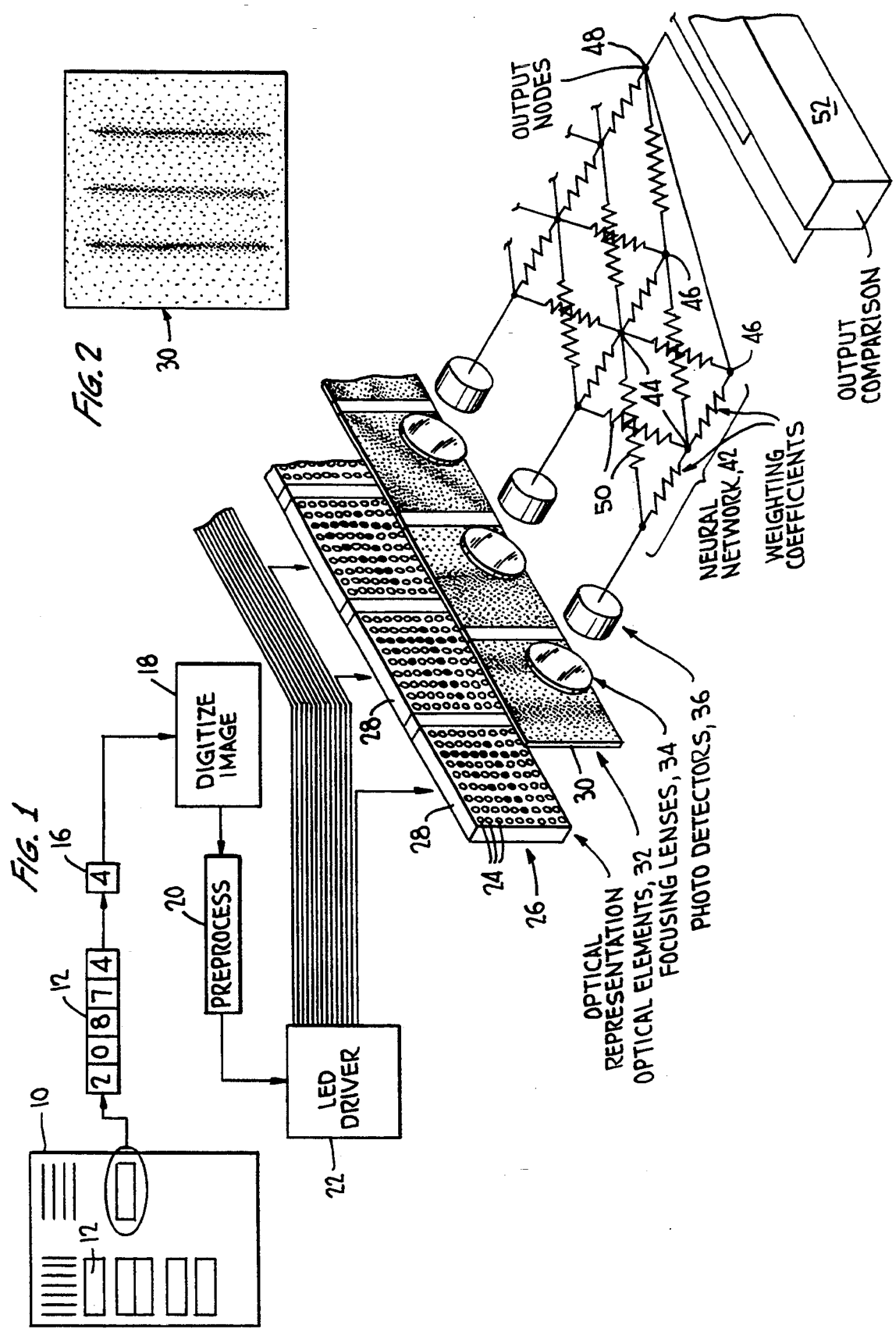

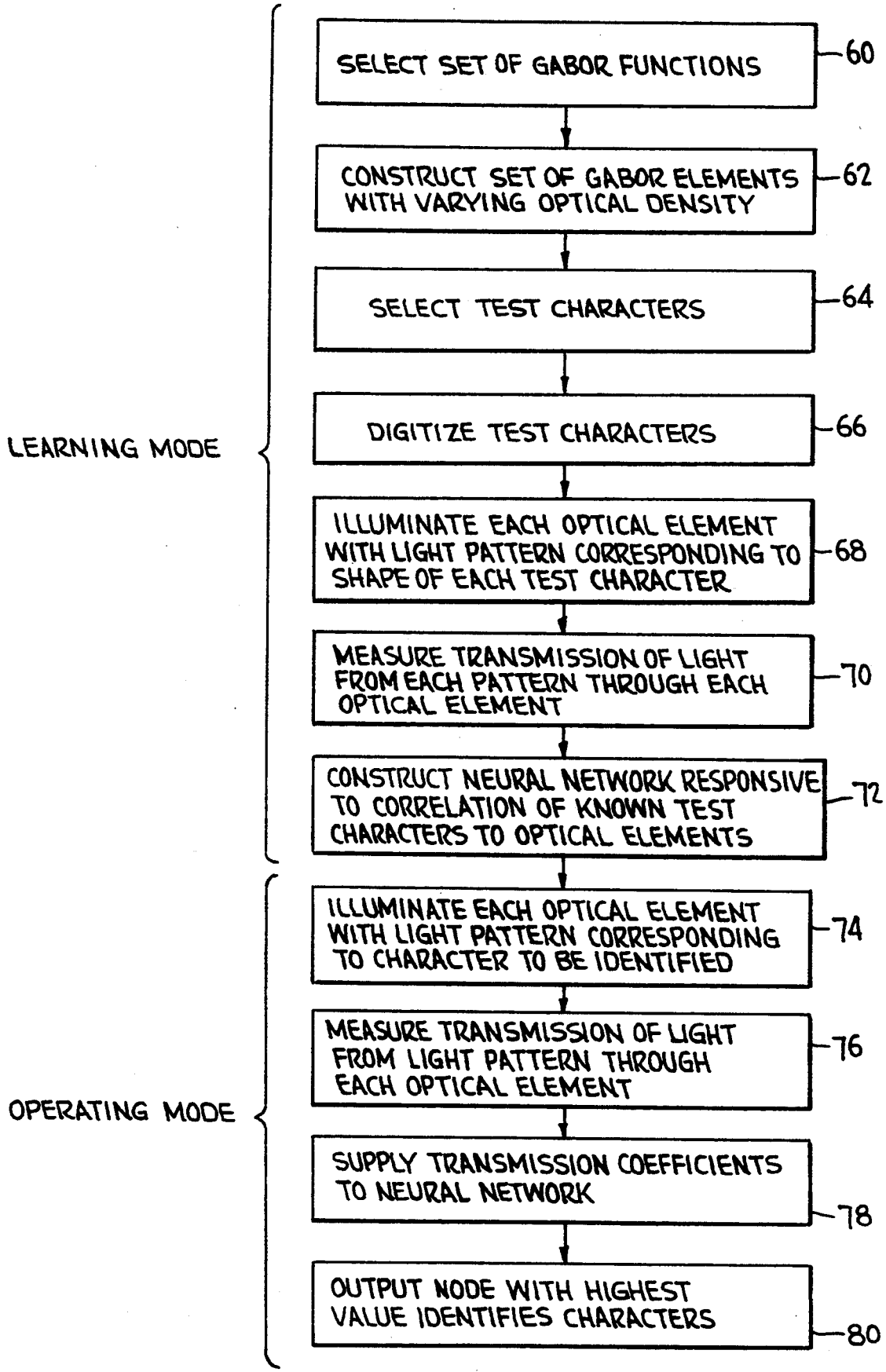

AUTOMATED RECOGNITION OF CHARACTERS USING OPTICAL FILTERING WITH MAXIMUM UNCERTAINTY - MINIMUM VARIANCE (MUMV) FUNCTIONS

BACKGROUND OF THE INVENTION

1. Field of the Invention

This invention relates to optical character recognition. More particularly, this invention relates to methods and apparatus for recognizing characters printed by hand or machine with high accuracy and speed at relatively low cost.

2. Discussion of the Prior Art

It is conservatively estimated that the data input segment of the data processing industry is a $25 billion per year business. A character recognition device saving half this cost would accordingly save more than $10 billion a year. Consequently, there has been for many years very substantial interest in automatic recognition of characters. Recent years have seen substantial success in recognition of machine-printed characters, e.g., typed or computer printed characters, and useful equipment is now commercially available. However, a vast amount of data is still collected by hand, e.g., on census forms, tax forms, hand printed envelopes and the like. It would be highly advantages if similar equipment could be developed for recognizing hand printed characters.

Relevant work done previously by the inventors and co-workers is reported in a number of papers, as follows: "Self-Organizing Neural Network Character Recognition on a Massively Parallel Computer", Wilson et al, *Proceedings of International Joint Conference on Neural Networks*, II, pp. 325-329, Jun. 18, 1990; "Analysis of a Biologically Motivated Neural Network for Character Recognition", Garris et al, in *Proceedings: Analysis of Neural Network Applications*, ACM Press, George Mason University, May 1991; "Methods for Enhancing Neural Network Handwritten Character Recognition", Garris et al, *International Joint Conference on Neural Networks*", Volume I, IEEE, July 1991; "Massively Parallel Implementation of Character Recognition Systems", Garris et al, report NISTIR 4750 published by the U.S. Department of Commerce (1992); and "Training Feed Forward Neural Networks Using Conjugate Gradients", Grother et al, report NISTIR 4776 published by the U.S. Department of Commerce (1992).

Each of these reports relates to use of digital processing systems for recognizing hand printed characters using Gabor functions. Gabor functions were proposed by Dennis Gabor in 1946. The great utility of Gabor functions in recognition of characters and related image processing functions are discussed by Daugman in "Uncertainty relation for resolution in space, spatial frequency, and orientation optimized by two-dimensional visual cortical filters", *J. Opt. Soc. Am. A.*, Volume 2, No. 7, July 1985 and in "Complete Discrete 2-D Gabor Transforms by Neural Networks for Image Analysis and Compression", *IEEE Transactions on Acoustics, Speech and Signal Processing*, Volume 36, No. 7, July, 1988.

It is of particular interest to compare the two-dimensional receptive-field profiles in the upper third of FIG. 3 of the 1985 Daugman paper, which represent the measurement of the relative sensitivity of optical cells in cat eyes, with the representations of selected two-dimensional Gabor functions shown in the middle third of FIG. 3. As shown in the lower third of FIG. 3, the Gabor filters to a considerable degree provide a mathematical model of vision as optimized by evolution. Hence it is logical to assume, as shown by Daugman, that Gabor functions would be useful filters to extract maximum information from an image to be analyzed by machine.

Mathematically, the Gabor functions in essence encode both spatial and frequency information. Thus, for example, the capital letter H includes two vertical strokes. It is intuitively obvious that the parallel relation of these strokes is useful in recognizing an H. The parallel relation of these two strokes is in essence frequency information, as is their spacing. The orientation of the strokes is spatial information. It is apparent from the work of Daugman and the earlier work of the present inventors and co-workers referred to above that the Gabor functions are more useful in character recognition and other forms of image analysis than other simpler sorts of filters used previously for character recognition.

A further set of functions useful in image and specifically character recognition may be derived using Karhunen Loève ("K-L") transforms. See Grother, "Karhunen Loève Feature Extraction for Neural Handwritten Character Recognition", *SPIE*, Vol. 1709 (April 1992). Functions derived from K-L transforms are similar to Gabor functions in that both encode both frequency and spatial information in an image employing a limited set of functions. That is, when either Gabor or K-L derived functions are correlated with an image, the resulting value is proportional to similarity of the frequency and spatial content of the image and of the function. Both Gabor and K-L derived functions are characterized for the purpose of this application as maximum uncertainty—minimum variance (MUMV) functions. Both K-L and Gabor MUMV functions are "robust" in the sense of being capable of yielding useful results despite minor variations in the shape of images to be recognized. For example, some writers connect the horizontal bar at the top of the character "5" to the body of the character, some do not. This aspect of the robustness characteristic is referred to as "maximum uncertainty". Further, both Gabor and K-L derived functions are also robust in the sense of relying on statistical features present in the entire class of characters. This aspect of robustness is referred to as "minimum variance".

An important distinction between processes for image recognition employing Gabor functions and K-L derived functions lies in the method whereby the functions are derived. Gabor functions are derived a priori, that is, by mathematical calculation based on one or more of an infinite set of equations proposed by Gabor. See the May 1991 *Proceedings: Analysis of Neural Networks Applications* paper of Garris et al, supra. K-L transforms, by comparison, are derived only through correlation of a large sample of actual images of, e.g., the characters to be recognized. See the 1992 Grother *SPIE* paper, supra. Thus the steps performed to generate a set of Gabor functions are very different from those required to generate a set of K-L functions, although thereafter the functions may be employed similarly.

Reference herein to MUMV functions should be understood to include both Gabor and K-L derived functions, except where the context (e.g., by reference to the method of their generation) clearly indicates the contrary.

Fourier transforms have been employed for image recognition, including character recognition. Fourier transform processing of an image provides a series of coefficients representing the power and relative phase of various frequency components present in the image. Fourier coefficients thus derived encode both frequency and spatial information. However, a complete set of Fourier coefficients may typically include some 1024 coefficients; this large amount of data requires prohibitive amounts of digital processing to yield useful image recognition. Accordingly, the set of coefficients is usually truncated at 32 or 64; consequently much useful information—usually the phase information—is lost, resulting in significant loss of accuracy and utility.

For example, U.S. Pat. No. 4,989,257 to Horowitz discusses application of Fourier transforms for character recognition or similar image processing problems. Horowitz discloses dividing an image of a character into "eight rings and 24 slices" and carrying out "various Fourier transforms, autocorrelations, movement calculations, and sorting operations on the resulting data." See the Abstract. It is self-evident that such a process would require an immense amount of computer time to recognize a single character.

Other functions which have previously been employed for extraction of features from images and related purposes such as character recognition include Walsh functions. Walsh functions are essentially black-and-white "checkerboard" patterns which may be correlated with an image to be characterized. Walsh functions detect "spectral", i.e., frequency information, and may locate a single "topological feature." See U.S. Pat. No. 4,590,608 to Chen et al. The binary—that is, black or white—nature of the Walsh transforms renders their use unduly sensitive to lateral and vertical displacement of the image.

Other patents which may be of interest include U.S. Pat. No. 4,082,431 to Ward, III, showing carrying out Fourier transforms of images using optical holograms and incoherent light; U.S. Pat. No. 3,879,605 to Carl et al, showing a Walsh transform computer implementing Kronecker-matrix transformations; U.S. Pat. No. 5,047,968 to Carrington et al, showing a system for using Fourier transforms to correct distortion in images; and U.S. Pat. No. 5,050,220 to Marsh et al, disclosing an optical fingerprint correlator employing digital Fourier transform techniques to measure the correlation between an unknown print and a sample or known print for characterization purposes.

U.S. Pat. No. 4,854,669 to Birnbach et al discloses a spatial filter with selectable modulation transfer function to remove unwanted portions of an image employing Fourier transform techniques. As indicated above, to obtain accurate image recognition employing Fourier-transform techniques requires that frequency and phase information in the image be preserved. To do so optically requires an apparatus manufactured to high tolerance, employing a coherent light source (e.g., a laser) and a number of costly optical elements. Such systems, as exemplified by Birnbach, are too complex and costly for practical use.

It will be appreciated from review of the above documents that optical techniques have been used to correlate Fourier transforms with characters or other elements of images to be recognized, while digital computers have similarly been used to perform Walsh and Fourier transform filtering. However, the art does not teach employment of MUMV functions, such as Gabor or K-L derived functions, other than in digital systems.

The process of correlating an image of a character to be recognized with a MUMV function to yield a correlation coefficient, e.g. for input to a neural network, as described in the papers of the inventors and co-workers described above, has always (to the knowledge of the present inventors) been carried out generally according to the following steps. A character to be recognized is identified, e.g., by locating it within a particular box on a form to be converted from hand printed hard copy to computer data. The character is digitized by generating an array of bits each responsive to the density of the corresponding pixel in the image. The value of each pixel of the image is then multiplied by the corresponding local value of a MUMV function, that is, by the corresponding value in a second matrix wherein each element of the matrix represents the local value of the MUMV function. The results of all these multiplications (which may be 10,000 or more multiplications) are summed to yield a value for the correlation of the image of the character to be recognized with the MUMV function. A similar set of calculations is carried out with respect to each of the complete set of MUMV functions selected.

The result is a series of coefficients, each representing the correlation of the character with one of the set of MUMV functions. These coefficients are then supplied as inputs to a neural network. In the neural network the coefficients are weighted in accordance with previously calculated data and summed, yielding a set of output values identifying the character to be identified. These steps, and the step of calculating the weights to be applied to the coefficients, are described in the papers of applicants and co-workers and of Daugman referred to above. Where Gabor functions are to be employed as the MUMV functions, the steps of selecting the Gabor functions to be employed from the infinite set of Gabor functions possible and their calculation may be carried out as described in the Garris et al *Proceedings: Analysis of Neural Network Applications* paper, supra; if K-L transforms are to be used to calculate K-L derived functions, this may be done as described in the Grother *SPIE* paper, supra. Each of the papers referred to above is accordingly incorporated herein by reference.

It will be appreciated from the above that the step of correlating an image of a character to be recognized with each of a set of MUMV functions has heretofore always necessitated a vast number of multiplications and summation of the results to yield the corresponding coefficients. The coefficients thus obtained, each corresponding to the correlation of a single character with one of the set of MUMV functions, are then supplied to a neural network for weighted summation. Such enormous quantities of calculations are optimally carried out on very high speed massively parallel computing systems. While very useful results have been obtained, as shown in the papers of the inventors and co-workers referred to above, such equipment is expensive and likely to remain so for the near term. Moreover, even using state-of-the-art massively parallel computers the analysis of hand printed characters still requires substantial processing time.

It would be accordingly be desired to provide a method and apparatus for character recognition realizing the advantages of image processing using Gabor or K-L derived MUMV functions that could implemented without costly high speed parallel processing computer equipment.

OBJECTS AND SUMMARY OF THE INVENTION

It is therefore an object of the invention to provide an inexpensively implemented system for recognizing characters employing MUMV functions.

The present invention satisfies the above needs of the art and objects of the invention by providing a method and apparatus for recognizing characters using optically implemented MUMV filters. The method of the invention includes constructing a neural network for subsequent weighted summing of optical transmission coefficients. Thereafter, according to the method of the invention, patterns of light corresponding to the character to be recognized are transmitted through each of a set of optical elements. Each optical element exhibits varying optical density corresponding to the values of a two-dimensional MUMV function. The amount of light passing through each optical element is measured by a single photodetector. The voltages output by the photodetectors, referred to as transmission coefficients, are proportional to the amount of the pattern of light corresponding to the character to be recognized having been transmitted through each of the optical elements implementing the set of MUMV functions. Thus, the transmission coefficients represent optical correlations of the image of the character to be recognized with the MUMV functions. The transmission coefficients are supplied in parallel as the inputs to a neural network. The neural network carries out weighted sums of the transmission coefficients, that is, of the outputs of the photodetectors. The output node of the neural network having the highest output voltage identifies the character.

The patterns of light corresponding to the character to be recognized may be generated in any of several different ways. For example, the character can be digitized as generally practiced in the prior art, and individual light emitting diodes of an array can be lit corresponding to the shape of the character. Such arrays could simply be juxtaposed to an optical element, for example, a photographic film having varying optical density corresponding to one of the MUMV functions. A set of arrays of light emitting diodes all connected in parallel to driver electronics might be juxtaposed to a set of optical elements implementing each of the MUMV functions, to simultaneously illuminate each optical element. A like number of photodetectors would simultaneously detect the amount of light passing through each of the optical elements, and supply corresponding voltages as inputs to a neural network. Such a system would provide a simple and highly robust apparatus for recognizing characters.

Other methods of providing patterns of light corresponding to the image of the character to be recognized might simply employ a video signal to illuminate a display screen juxtaposed to an optical element implementing a MUMV function. Indeed, it might be possible optically to project an image of the character directly on the optical element implementing the MUMV function. However, in the preferred embodiment, the image of the input character will be digitized prior to illumination of the optical element implementing the MUMV filter. In this way certain preprocessing steps known to the prior art (e.g., removal of boxes surrounding the characters appearing in the image of the form, character rotation, and so forth) may be conveniently performed.

In the event Gabor functions are chosen to be employed as the MUMV functions implemented by the optical elements, the Gabor functions can be selected by reference to the teachings in the papers of the inventors and co-workers discussed above, e.g., the Garris et al May 1991 *Proceedings: Analysis of Neural Network Applications* paper, supra. As noted above, such Gabor functions may be derived mathematically. If K-L derived functions are to be employed as the MUMV functions, these are generated by examination of a large number of samples of characters of the set to be identified, e.g., the ten numerical digits, as explained in the Grother *SPIE* paper.

Optical elements implementing the MUMV functions may comprise photographic film having a large number of very small dots printed thereon, the density of the dots corresponding to the value of the MUMV function at each location. Such elements can be readily prepared using conventional computer equipment with associated software as used for preparing transparencies of data for projection or the like. Alternatively, active photo-optic elements such as liquid crystal displays and the like might be used to implement MUMV functions, particularly if desired to vary the elements over time. For example, a system including such variable optical elements might be useful for recognition of both handprinted letters and numbers.

In a first learning mode the system may be operated using known characters to measure transmission coefficients directly. From these the weighting values to be used by the neural network may be determined and the neural network then constructed. Alternatively, the neural network can be constructed using weighting values calculated mathematically according to the papers discussed above. The neural network can be implemented by connecting resistors implementing the weighting values between input nodes, intermediate nodes, and output nodes, or mathematically.

BRIEF DESCRIPTION OF THE DRAWINGS

The invention will be better understood if reference is made to the accompanying drawings, in which:

FIG. 1 is a schematic perspective view of an exemplary embodiment of apparatus according to the invention;

FIG. 2 is an idealized representation of an optical element implementing a particular MUMV function, in this example a Gabor function; and FIG. 3 is an exemplary flow chart of one method of operating the system of the invention in a learning mode followed by an operating mode.

DESCRIPTION OF THE PREFERRED EMBODIMENTS

As described above, according to the invention patterns of light representative of images of characters to be recognized are transmitted through optical elements implementing MUMV functions. The amount of light transmitted from the pattern through the optical element and detected by a photodetector in effect represents the correlation of the MUMV function with the image of the character, but is a far simpler method of deriving that correlation than the normal mathematical step of multiplying the value of each pixel of a digitized version of the image by the corresponding local value of the two-dimensional MUMV function.

FIG. 1 shows an exemplary system for carrying out these steps, as well as the subsequent steps in identifying the character via the neural network. Thus, in FIG. 1 a printed form 10 having a number of defined fields 12 is optically scanned. One field 12 having a number of subfields within which users are directed to write individual numerals, such as the numeral "4" shown in subfield 14, is individually scanned as indicated generally at 16. The image is then digitized in a conventional manner, as indicated at 18. It will be appreciated that it might be more convenient to digitize the image of the entire form prior to analysis of individual characters. After digitization, the image may be preprocessed, also in a generally conventional manner, as indicated at 20. Such preprocessing steps may include removal of the boxes around the character, rotation of the character to different positions for separate subsequent analysis according to the apparatus of the invention, and other related and generally known steps. The preprocessed digitized image is supplied to an LED driver 22, that is, a simple switching circuit providing outputs for driving a number of individual LEDs 24 arranged in a set 26 of arrays 28 of LEDs 24. Thus the image of the numeral "4" is represented by a pattern of light emitted by the individual LEDs 24 of each array 28 of LEDs in the set 26 of arrays 28.

The same pattern of light corresponding to the image of the character to be recognized is transmitted simultaneously through each optical element 30 in a set 32 of optical elements. The complete set 32 of optical elements typically includes thirty-two elements 30. Each optical element 30 exhibits varying optical density corresponding to the value of one of the individual two-dimensional MUMV functions, either a Gabor function calculated mathematically or a K–L function derived from examination of a large number of images of the set of characters to be recognized. FIG. 2 illustrates one of the elements 30, in this case implementing a particular Gabor function. As can be seen from FIG. 2 the optical element 30 is partially transparent, having varying optical density corresponding to the value of the two-dimensional Gabor function at that particular point in the optical element 30.

Returning to the discussion of FIG. 1, it will be apparent that the patterns of light emitted by arrays 26 of LEDs 24 will pass varyingly through the different optical elements 30, such that optical correlations of the same pattern of light with each of the Gabor functions implemented by the set 32 of optical elements 30 is simultaneously performed. The light transmitted through each optical element 30 is collected by a corresponding focusing lens 34, and is represented by the output voltage of a photodetector 36.

These voltages, referred to herein as transmission coefficients, are supplied as inputs to input nodes 40 of a neural network 42. The neural network 42 comprises a number of resistors 50 connected between the input nodes 40, intermediate or "hidden" nodes 44 and 46, and output nodes 48. In effect, the resistors 50 are connected between the various nodes in accordance with weighting data determined during operation of the system in a learning mode. That is, the values of the various resistors 50 indicate the way in which the correlations between the images of the characters and the MUMV functions, represented by the transmission coefficients supplied as voltages to the input nodes, can best be combined to yield voltages at the output nodes most definitively identifying the individual characters.

For example, suppose it has been determined during a learning mode of operation that the Gabor functions numbered two, seven and nine out of the set of thirty-two are particularly useful in representing the numeral "4". That is, when a pattern of light corresponding to an image of the numeral "4" illuminates each of the optical elements 30, the output voltages provided by the corresponding photodetectors 36 will be highest opposite the optical elements 30 numbered two, seven and nine. The function of the neural network 42 is to provide weighted electrical connections between the various input nodes 40 such that the voltages at the output nodes 48 identify the character. More specifically, the effect of connecting the neural network between the input and output nodes is to cause each of the output nodes to exhibit a characteristic voltage level responsive to each image of a character to be recognized. Typically, the neural network is constructed such that the output node corresponding to the known character—in this case, the numeral "4"—exhibits the highest voltage, thus identifying the character to be recognized.

The weighting coefficients implemented by the neural network may be calculated as described in the papers of the inventors and co-workers described and incorporated by reference above.

Thus the final product of the neural network is a set of voltages on the output nodes 48 which are compared in an output comparison device 52. Comparison device 52 may be implemented as a so-called winner-take-all circuit as described by Lazzaro et al in "Winner-Take-All Networks of O(N) Complexity", *Advances in Neural Information Processing Systems* 1, Ed. D. S. Touretzky, 1989, pp. 703–711. This paper in fact describes in general neural networks of the kind just described, and is incorporated by reference herein.

It will be appreciated that numerous other methods of providing patterns of light corresponding to the images of characters to be recognized may be employed, including direct projection of the image of the character onto the optical elements implementing the MUMV functions. However, to so do would eliminate the advantages of preprocessing provided by digitizing the image. It would also be possible to digitize and preprocess the image and then provide a video signal to each of a number of displays each illuminating an optical element corresponding to one of the MUMV functions.

As noted above, the optical elements 30 can be implemented by photographic film or like media exhibiting density variations corresponding to the value of the two-dimensional MUMV functions. Alternatively, active photo-optic elements such as liquid crystal displays, wherein the optical density of the element varies according to an applied signal, might be employed as the optical elements 30.

It will further be appreciated that the individual photodetectors 36 might in some cases desirably be replaced with arrays of photodetectors for individually measuring the correlation between the portions of patterns of light representing images of characters or other images to be recognized and optical elements implementing the MUMV functions.

It will also be recognized that the voltages provided by the photodetectors 36 indicative of the transmission coefficients could be measured and used as inputs to a mathematically implemented neural network to identify the character, rather than being used as input voltages for a neural network consisting of hardwired resistances, as shown. As noted, connection of the resistances between the input, intermediate and output nodes provide weighted sums of the transmission coefficients; the weighted summing operation could be carried out equally well mathematically.

FIG. 3 shows a generalized flow chart of the method of the invention implemented such that comparison of patterns of light responsive to known characters with optical elements implementing MUMV functions is used in a "learning mode" to calculate the values for weighting the sums subsequently computed by the neural network in recognition of characters. In this example Gabor functions are chosen as the MUMV functions. It will be appreciated that the values of the weights for the weighted sums computed in the neural network could equivalently be calculated mathematically, as described in the papers of the present inventors and co-workers described and incorporated by reference above.

Thus, as shown in FIG. 3 the first step 60 in the learning mode is selection of a set of Gabor functions. It will be appreciated that the Gabor functions are infinite. However, it has been found by the inventors and co-workers that a set of thirty-two two-dimensional Gabor functions is adequate for recognition of hand-written characters employing digital techniques carried out on a massively parallel computer. It is anticipated that the same set of two-dimensional Gabor functions will be suitable for optical correlation as described and claimed herein. The particular set of thirty-two two-dimensional Gabor functions employed in practice of the invention may be those described for the case where i=2 in Table 1 on page 163 in the Garris et al May 1991 *Proceedings: Analysis of Neural Network Applications* paper incorporated by reference above.

The next step in the learning mode is step 62, wherein a set of optical elements exhibiting varying optical density corresponding to the values of the two-dimensional Gabor functions is constructed. As indicated, step 62 could perhaps most readily be accomplished by calculating the values of the Gabor functions at each point in the image, and providing small opaque dots of corresponding varying density on a sheet of transparent media such as photographic film, as illustrated in FIG. 2. Thus, in step 62 a set of thirty-two such optical elements would be constructed implementing the Gabor functions selected in step 60. As calculated the Gabor functions include positive and negative components; as a negative value cannot be represented as a density, an intermediate gray-scale density is set equal to the zero value of the function.

In step 64, a set of test characters, that is, characters exhibiting normal variation in handwriting but of known identity is selected. In step 66 the test characters are digitized generally according to the teachings of the prior art. Step 66 may also include preprocessing as described above if deemed necessary.

In step 68 each of the optical elements constructed in step 62 is illuminated with a light pattern corresponding to the shape of each of the test characters. As noted, step 68 can be implemented by lighting LED's in an array in a pattern corresponding to the digitized image of each of the test characters. In step 70 the amount of light transmitted through each of the optical elements upon illumination by the pattern of light corresponding to each test character is measured to generate a set of transmission coefficients equal to the number of Gabor elements multiplied by the number of test characters. In step 72 a neural network is constructed responsive to the thus measured correlation of each of the test characters with respect to each of the optical elements implementing the Gabor functions.

In a digitally-implemented method of practice of the learning mode, step 62 would typically be replaced by a step of generating a set of two-dimensional arrays of values, each value of each array being responsive to the value of the corresponding Gabor function at the corresponding point therein. Steps 68 and 70 would then simply involve mathematically correlating the image of each test character with each Gabor function, that is, multiplying each element in an array representing the image of the test character by the corresponding element in the array representing one of the Gabor functions, and summing the results, to yield a value responsive to their respective correlation. The neural network could then be constructed in step 72, as above, with the correlations thus calculated replacing the transmission coefficients measured as above.

If it were desired to manufacture a commercial product implementing the invention, steps 60–70 would typically be performed in the prototype stage, and step 72 would essentially complete manufacture of the device.

Subsequently, in the operational mode, in order to identify a particular character each of the optical elements would be illuminated in step 74 with a light pattern corresponding to the image of the character to be identified. As indicated above in connection with FIG. 1, normally each optical element would be simultaneously illuminated with the identical pattern of light, corresponding to a single character to be identified.

In step 76 the amount of light transmitted from the pattern through each of the optical elements is measured. In the implementation of FIG. 1, step 76 is performed by the photodetectors 36, each providing an output voltage indicative of the corresponding transmission coefficient.

In step 78, the transmission coefficients are supplied to the neural network; again, in the implementation of FIG. 1, the transmission coefficients are the output voltages provided by the photodetectors 36. Resistances 50 thus carry out a large number of weighted summations of the transmission coefficients; that is, varying amounts of current are conducted through the resistors implementing the neural network, such that one of the output nodes 48 has the highest voltage. Finally, in step 80 the output node 48 at which the highest voltage is present is identified. This output node indicates the identity of the character to be identified.

If it were desired to implement the method of the observation using K–L derived functions rather than Gabor functions, step 60 would be replaced with a step of generating K–L functions by examining a large sample of characters of the set to be identified, such as the ten numerals, as described in the Grother *SPIE* paper, supra.

As indicated above, there are numerous additional modifications and improvements which could be made in the system of the invention. In particular it will be appreciated that the apparatus for practicing the process of the invention described in connection with FIG. 1 is highly schematic, and that numerous other devices for carrying out the method of the invention are considered to be within the scope of the appended claims.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. Method for recognizing characters, comprising the steps of:

optically comparing each character with each of a number of optical representations of a limited set of maximum uncertainty—minimum variance (MUMV) functions, wherein each said comparison is performed by transmitting a pattern of light corresponding to an image of the character through an optical element exhibiting variation in optical density responsive to the corresponding MUMV function and detecting the total amount of light transmitted through the optical element, to yield a set of transmission coefficients equal in number to said optical representations of said set of MUMV functions;

supplying said set of transmission coefficients to a neural network; and employing said neural network to compute weighted sums of the transmission coefficients, said weights applied to said transmission coefficients in computation of said weighted sums having previously been determined in accordance with comparison of known characters with said limited set of MUMV functions.

2. The method of claim 1, wherein said step of transmitting a pattern of light through an optical medium is performed by digitizing an image of the character and activating individual ones of an array of light emitting devices corresponding to said digitized image.

3. The method of claim 2, wherein said light emitting devices are light emitting diodes.

4. The method of claim 1, comprising the further steps of calculating values for a limited set of two dimensional Gabor functions, and constructing a set of said optical elements, each comprising a varyingly transparent medium exhibiting optical density variation responsive to said calculated values.

5. The method of claim 1, comprising the further steps of performing Karhunen-Loève transform processing of a large number of sample characters including the characters to be recognized, and constructing a set of said optical elements, each comprising a varyingly transparent medium exhibiting optical density variation responsive to said processing of said sample characters.

6. The method of claim 1, wherein said neural network employed for computing weighted sums is a network of resistors connected between nodes of said network, the values of said resistors corresponding to weights for computing said weighted sums.

7. The method of claim 1, wherein said limited set of MUMV functions comprises thirty-two two-dimensional Gabor functions.

8. The method of claim 1, wherein each said character is simultaneously compared to each of the optical representations of said limited set of MUMV functions.

9. The method of claim 1, wherein said step of detecting the total amount of light transmitted through the optical element is performed employing a single photodetector corresponding to each of said optical elements.

10. A method of operating a system for optical character recognition employing optical comparison of characters to be recognized to a limited set of maximum uncertainty—minimum variance (MUMV) functions, said method comprising a learning mode and an operating mode, said learning mode comprising the steps of:

constructing a set of varyingly transparent optical elements, each exhibiting variation in optical density corresponding to one of a limited set of MUMV functions;

selecting a set of known test characters;

transmitting a pattern of light corresponding to each of said set of test characters through each of said set of optical elements while measuring the amount of each pattern of light transmitted through each set of optical elements, thus determining a set of transmission coefficients corresponding to the transmission of the patterns of light corresponding to each of said set of known test characters through each of said optical elements; and analyzing the set of transmission coefficients to establish weights in a neural network for summing transmission coefficients responsive to subsequent transmission of patterns of light corresponding to characters to be recognized through said set of optical elements; and said operating mode comprising the steps of:

transmitting a pattern of light corresponding to one of said set of characters to be recognized through each of said set of optical elements while measuring the amount of said pattern of light transmitted through each set of optical elements, thus determining a set of transmission coefficients responsive to said measurements;

supplying said set of said transmission coefficients corresponding to said character to be recognized to said neural network; and employing said neural network to determine the identity of the character to be recognized.

11. The method of claim 10, wherein said step of transmitting a pattern of light corresponding to a character through an optical element is performed by digitizing an image of the character and activating individual ones of an array of light emitting devices corresponding to said digitized image.

12. The method of claim 11, wherein said light emitting devices are light emitting diodes.

13. The method of claim 10, wherein said step of constructing a set of optical elements comprises the further steps of calculating values of a limited set of Gabor functions, and constructing each said optical element as a varyingly transparent medium exhibiting optical density variations responsive to said calculated values.

14. The method of claim 10, wherein said step of constructing a set of optical elements comprises the further steps of performing Karhunen-Loève transform processing of images of a large number of sample characters including the characters to be recognized, and constructing a set of said optical elements, each comprising a varyingly transparent medium exhibiting optical density variation responsive to said transform processing.

15. The method of claim 10, wherein said neural network employed for computing weighted sums is a network of resistors connected between nodes of said network, the values of said resistors corresponding to said established weights for comparing said weighted sums.

16. The method of claim 10, wherein said limited set of MUMV functions comprises thirty-two two-dimensional Gabor functions.

17. The method of claim 10, wherein a pattern of light corresponding to a character to be recognized is simultaneously transmitted through each of the optical elements corresponding to one of said limited set of MUMV functions.

18. The method of claim 10, wherein said steps of said learning mode are performed at a time of assembly of said system for optical character recognition.

19. Apparatus for optical identification of characters, comprising:

means for transmitting a pattern of illumination corresponding to the shape of an individual character to be identified through a series of optical elements each exhibiting variation in optical density corresponding to one of a predetermined set of two-dimensional maximum uncertainty-minimum variance (MUMV) functions;

means for measuring the amount of light transmitted from each of said patterns through each of said corresponding optical elements, and for generating a transmission coefficient responsive to each said measurement;

means for computing weighted sums of the transmission coefficients corresponding to the amount of light transmitted by essentially identical patterns of illumination corresponding to each character to be recognized through each of the optical elements; and means for identifying the character to be identified responsive to said weighted summation of the transmission coefficients.

20. The apparatus of claim 19, wherein said means for computing weighted sums is a neural network.

21. The apparatus of claim 20, wherein said neural network comprises a network of resistances connected between input nodes, intermediate nodes and output nodes, whereby voltages corresponding to transmission coefficients at said input nodes are weighted by the values of resistors connected between said input nodes, said intermediate nodes, and said output nodes, and whereby the voltage present on each of the output nodes is indicative of the identity of the character to be identified.

22. The apparatus of claim 19, wherein said optical elements each comprise a transparent member having a varyingly dense pattern of opaque dots printed thereon to provide varying optical density thereof corresponding to one of said set of MUMV functions.

23. The apparatus of claim 19, wherein said MUMV functions are Gabor functions.

24. The apparatus of claim 19, wherein said MUMV functions are functions generated by Karhunen-Loève transform processing of images of a large sample of characters including the characters of the set of characters to be identified.

25. The apparatus of claim 19, further comprising means for digitizing said image of said character, and means for driving said means for generating a pattern of illumination responsive to the digitized image of said character.

* * * * *